United States Patent
Farrugia et al.

(10) Patent No.: US 9,264,234 B2
(45) Date of Patent: Feb. 16, 2016

(54) SECURE AUTHENTICATION OF IDENTIFICATION FOR COMPUTING DEVICES

(75) Inventors: Augustin J. Farrugia, Cupertino, CA (US); David M'Raihi, Cupertino, CA (US); Mathieu Ciet, Paris (FR); Thomas Icart, Paris (FR)

(73) Assignee: APPLE INC., Cupertino, CA (US)

(*) Notice: Subject to any disclaimer, the term of this patent is extended or adjusted under 35 U.S.C. 154(b) by 889 days.

(21) Appl. No.: 13/357,454

(22) Filed: Jan. 24, 2012

(65) Prior Publication Data

US 2012/0311338 A1 Dec. 6, 2012

Related U.S. Application Data

(60) Provisional application No. 61/493,335, filed on Jun. 3, 2011.

(51) Int. Cl.
*H04L 29/06* (2006.01)
*H04L 9/32* (2006.01)
*H04L 9/06* (2006.01)

(52) U.S. Cl.
CPC ............. *H04L 9/3247* (2013.01); *H04L 9/06* (2013.01); *H04L 2209/16* (2013.01)

(58) Field of Classification Search
CPC . H04L 9/3236; H04L 63/0876; H04L 9/3247; G06F 17/30067; G06F 21/86
USPC ............... 726/2, 5, 18, 30, 34; 713/176, 181; 707/698; 711/100; 380/255
See application file for complete search history.

(56) References Cited

U.S. PATENT DOCUMENTS 8,151,346 B2 * 4/2012 Amano ........................... 726/21
2002/0095601 A1 * 7/2002 Hind et al. ..................... 713/201

* cited by examiner

*Primary Examiner* — Joseph P Hirl
*Assistant Examiner* — Leynna Truvan
(74) *Attorney, Agent, or Firm* — Adeli LLP

(57) ABSTRACT

In the field of computer and data security, the identifier (ID) of a computing device is protected by providing a secure signature used to verify the ID. The signature is computed from the ID using a "White Box" cryptographic process and a hash function. This provides a signature that is computationally easy to verify but difficult or impossible to generate by a hacker (unauthorized user). This method of first creating the signature and later verifying the identifier using the signature and the associated computing apparatus are thereby useful for protection against hacking of such identifiers of computing devices.

19 Claims, 2 Drawing Sheets

SECURE AUTHENTICATION OF IDENTIFICATION FOR COMPUTING DEVICES

CROSS REFERENCE TO RELATED APPLICATION

This application claims priority to U.S. Provisional Application No. 61/493,335, filed Jun. 3, 2011, incorporated herein by reference in its entirety.

FIELD OF THE INVENTION

This invention relates to data security and computers and to improving the security of computer enabled authentication processes.

BACKGROUND

Many encryption algorithms (processes) are primarily concerned with producing encrypted data that is resistant to decrypting by an attacker who can interact with the encryption algorithm only as a "Black Box" (input-output) model, and cannot observe internal workings of the algorithm or memory contents, etc. due to lack of system access. The Black Box model is appropriate for applications where trusted parties control the computing systems for both encoding and decoding ciphered materials.

However, many applications of encryption do assume that an attacker can access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important. Thereby a White Box cryptographic process is secure even in an untrusted computing environment.

Classically, software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (potentially hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications such as for audio and video data are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of the well known AES cipher that hide the operations performed during AES encryption/decryption by using table lookups (also referred to as TLUs) to hide the secret key within the table lookups, and hide intermediate state information that would otherwise be available in arithmetic implementations of AES. In the computer field, a table lookup is an operation consisting of looking up a value in a table (also called an array) at a given index position in the table.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key which is known at the time of compilation of the associated software (source code), such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output masks applied to this data are never removed during the process. In this solution, there is a need to know the key value at the code compilation time, or at least to be able to derive the tables from the original key in a secure environment.

The conventional implementation of a block cipher in the White Box model is carried out by creating a set of table lookups. Given a dedicated cipher key which is known at the code compilation time, the goal is to store in a table the results for all the possible input messages. This principle is applied for each basic operation of the block cipher. In the case of the AES cipher, these are the shiftRow, the add RoundKey, the subByte and the mixColumns operations.

Hash functions are also well known in the field of data security and cryptography. The principle is to take data (a digital message, digital signature, etc.) and use it as an entry to a hash function resulting in an output called a "digest" of predetermined length which is intended to uniquely identify ("fingerprint") the message. A secure (cryptographic) hash is such that any alteration in the message results in a different digest, even though the digest is much shorter than the message. Such hash functions are "collision-resistant" and "one-way" examples of a compression function.

A hash function thus is a deterministic procedure that accepts an arbitrary length input value, and returns a hash value of fixed or defined size. The input value is called the message, and the resulting output hash value is called the digest. The message integrity check is done by comparing the computed digest to an expected digest associated with the message.

Cryptography and data security deal with digital signatures, encryption, document authentication, and hashing. In all of these fields, there is a set of basic tools/functions which are widely used: hash functions. Several properties are required for the use of hash functions in cryptographic applications: preimage resistance, second preimage resistance and collision resistance.

In the recent years, much energy has been expended finding new hash functions, since collisions (weaknesses or successful attacks) have been found in the widely used SHA-0/1 and MD5 standard hash functions. After this security crisis involving MD5 and SHA-0/1, two hash function standards used for a long time without concern for their security, the U.S. NIST (National Institute of Standard and Technology) launched an international competition to define the new standard for hash functions. The competition started in 2008. Amongst the competitors, many were broken easily, since the submitters were not really aware of the cryptographic issues. Such hash functions are used in computing HMAC (Hash-based Message Authentication Code) which uses a cryptographic hash function in combination with a secret key to verify the authenticity and integrity of a message.

SUMMARY

Figure 1:
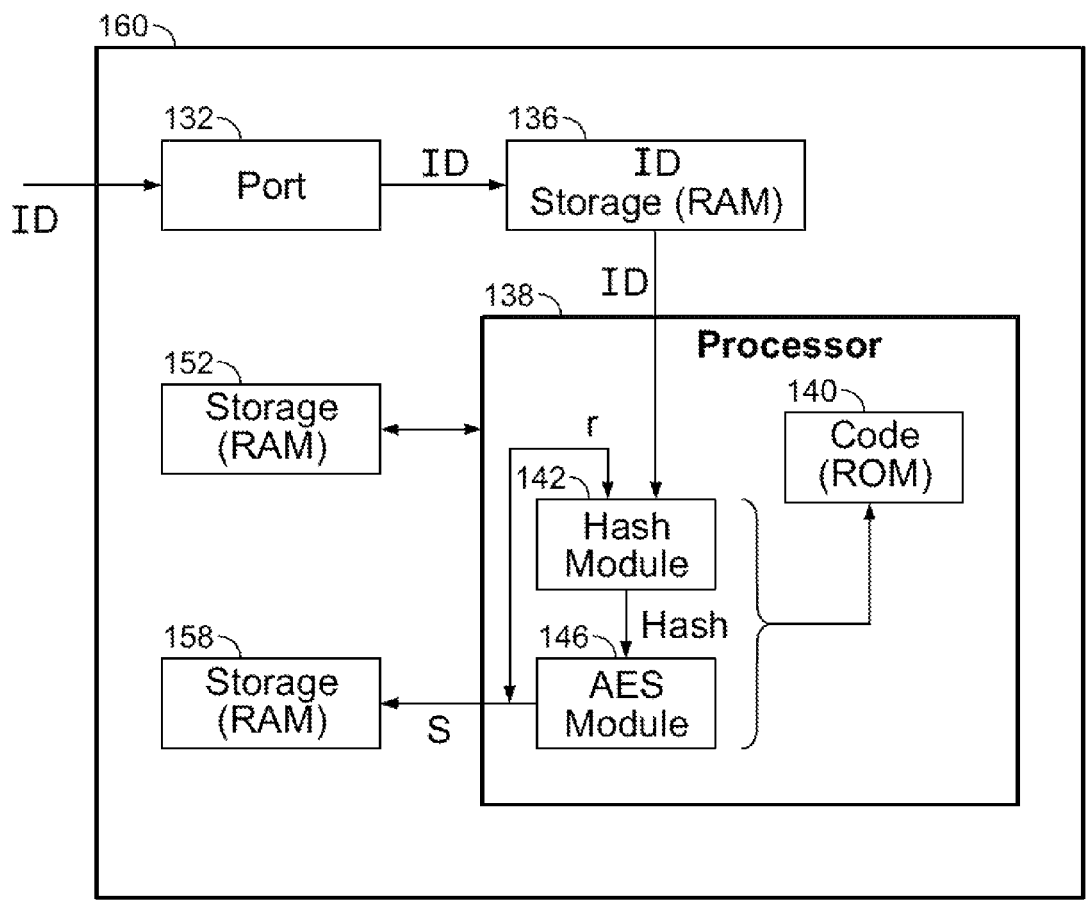
FIG. 1 shows a computing system in accordance with the invention.

In the field of computer security, computing a secure identifier or identification (ID) from a computer or other computing device is important in particular when accesses are associated to the computer's identity. The following explains how to improve generation of a secure ID and a method to compute a strong and secure computer ID. Generally every computer and other computing device as manufactured is assigned a unique identification number, also referred to as a serial number, or system serial number, which is stored in a read only memory (ROM) in the computing device. This device identification may also be a network or Internet Protocol (IP) provider ID assigned when the device joins a network or any other user unique identifier.

Aspects of the presented method include:

1. Use an asymmetric (cryptographically one-way) process such that forgery without a secret and correct signature for a given ID value is difficult, while verifying it is easy.

2. Use a White Box implementation of a block or other symmetric cipher process (such as a stream cipher, etc.) and a hash function in this asymmetric process. In a symmetric cipher process the same key is used for encryption and decryption.

Assume that each computer (computing device) has a function that returns from its ROM or equivalent its (numeric) ID value defined as a string of data bytes. Without any additional security, a malicious user (hacker) can easily obtain the conventional ID of another computer. Assuming that this identification method is used to grant access to various computer resources, the hacker can abuse the system and collect a variety of ID values that will grant him unauthorized access to these resources. In order to prevent this attack, the present method provides a secure signature value for the ID as a guarantee that a specific ID is valid.

Note that adding a conventional cryptographic digital signature to an ID does not increase security since given any ID, any malicious user is able to compute such a signature. To avoid this attack, the present method uses an asymmetrical signature computation process; this provides a signature that can be easily verified but that cannot be generated by a hacker. This method computes an asymmetrical signature (designated here S(ID)) such that, given any numeric ID, it is hard to generate a data pair (ID, S(ID)) for any user except the correct one, but it is easy to verify the signature value S(ID).

Additionally, this signature computation may take place on a potentially "unsafe" (insecure—in a White Box sense) computer platform, e.g., where the software developer does not control the computer as explained above, so one needs to protect this signature computation from a malicious user. Indeed, if such an attacker is able to easily use the signature generation function, he would be able to create valid (ID, S(ID)) pairs and break the signature security.

The following discloses generation of a secure ID on a computer, but is readily extended to other devices, and generally any electronic device with computational capacities referred to here as a computing device. The same technique may also be extended to the protection of processes, software applications and wherever the need for a strong identifier is required.

DETAILED DESCRIPTION

Two main elements are included in this method:

(1) Let H designate any given hash function. In the present context, a cryptographically strong hash function H is used because of its inherent property (in terms of the pre-image): it is computationally infeasible from a given hash value designated h, computed from function H, to find a bit string designated m such that:

$$H(m)=h$$

(2) The second element is a White Box symmetric keyed cipher process, for instance the WBAES (White Box version of the AES cipher, described above). Let k be a cipher key and let $WBE_k(m)$ be the encryption of a message (data) designated m and $WBD_k(m')$ be the decryption of encrypted m' with a White Box symmetrical cipher using the key k. An extension to HMAC (hash message authentication code) or other cipher processes as the cipher process is also possible. Use of a block cipher such as AES is advantageous since it is known to be fast in terms of computation time.

Consider two properties. One lies in the White Box symmetric cipher definition and the second comes from secure software implementations:

(a) From the execution of cipher process $WBE_k(m)$, it is computationally hard to find a way to obtain $WBD_k(m')$, for any message encrypted m'. This means that neither $WBE_k$ can be inverted nor k can be recovered.

(b) Protecting the execution of $WBD_k$ is possible using (in addition to the security aspects explained above with regard to the White Box environment) further conventional methods such as code or data obfuscations. This means that the cipher process $WBD_k$ cannot be called nor executed on a desired value by a hacker at the computing device under his control.

From a practical point of view, assertion (b) is possible because the symmetric cipher process is implemented in a White Box form and its execution is performed in one embodiment in for instance the kernel of a computer operating system, which is somewhat inherently secure. There are other known ways to protect against malicious calls and execution of a White Box cipher process, and they can also be used here.

On a given computer platform (computing device), let decryption process $WBD_k$ be an embedded secure function that cannot be accessed by any user of the computer, as explained above. Let encryption process $WBE_k$ be its inverse process, accessible by any computer user.

From the ID, define signature S, expressed algebraically as:

$$S(ID)=(r, WBD_k(H(ID, r)))=(S1, S2)$$

where r is a random (or pseudo random or constant) number value chosen at the computation time of S(ID). The comma ";" here indicates a concatenation operation of two operands. The larger the value of the random number, the more secure; preferably it is at least 16 Bytes long expressed in binary form.

To verify this signature value (S1, S2), any user can compute: $WBE_k(S2)$ from (S1, S2) and the (purportedly valid) ID and thereby verify that:

$$WBE_k(S2)==H(ID, S1)$$

This authenticates the (purportedly valid) ID.

Thanks to the properties explained above, generating an unknown but valid signature S for a bad ID value is computationally hard for any user. (Doing this is called forgeability.) Furthermore, if the signature S is computed from a random number r, that makes S different at each call to (instance of) this computation, further enhancing security.

Use of the hash function (with the previously defined properties) is advantageous. For instance, if no hash function (or a weak one) is used, then the above equation for $WBE_k(S2)$ becomes:

$$WBE_k(S2)=(ID, S1)$$

A malicious user would choose a random S2, compute $WBE_k(S2)=(ID', S1')$ and would use ID', S1', S2 to authenticate his computer, since it is a valid pair. The above described hash function properties ensure that such an attack is impossible (or at least very difficult computationally).

This method may also be used in the context of a client/server (computer network bilateral) authentication. The server sends a first random number r0 to the client computer and the client computer then computes:

$$S(D, r0)=(r1, WBD_k(H(ID, r0, r1)))=(S1, S2)$$

This signature computation has the advantage of not being reusable until the same random number r0 is used a second time. So if random number r0 is selected from a sufficiently large range, this ensures security of the method.

The computation of H(ID, r) in $WBD_k(H(ID, r))$ may be performed using conventional output masks and/or bit permutations to further enhance the security and the masking or permutation is applied to the result of the hash function. In cryptography, a mask is a numeric value that is logically or arithmetically combined using a masking operation with other data to obscure (hide) the other data. The mask is later removed by applying the inverse of the masking operation to the masked data, to recover the original data. A permutation is a predetermined re-ordering of the bits of data and has the same sort of concealment effect as a mask. From a practical point of view, this means that here the result of the hash function includes (as known in the field) an output mask or permutation which is understood (and this is the only way the White Box process operates) by the input of the $WBD_k$ cipher process. The mask or permutation may also be applied to the result of the cryptographic process. To verify the signature, the mask or permutation is removed at the appropriate computational step using an inverse (unmasking) process. The masking operation may be of any type, from simple to more complex and arithmetic or logical. This may be, for instance, an affine mask, or a weak encryption. The masking operation is not necessarily a permutation, in the sense that the masking operation may enlarge the length of the (masked) output value over that of the unmasked input value, unlike a permutation.

Applying output masks on the hash function improves robustness of the method by making it more difficult to hack the cipher process $WBD_k$. Furthermore, this makes calling the cipher process $WBD_k$ more difficult since the hacker must also break the masking technique. Further, the present method can be combined with other known code and data obfuscation techniques.

The above describes the general case of computing a signature from a set of inputs to generate a valid (ID, S(ID)) pair as a strong, secure signature for an identifier. In a variation, a plurality (a number greater than one and designated n) of signature generation functions is combined to identify a collection of computers, computer software applications, computer processes or resources. In other words, this is for multiple computing devices and/or device IDs. In the context of such an n-to-1 (n signature generators and 1 signature verifier) system, consider the following approach:

1. The n signature generation functions are similar but computed on different ID values.

2. The n signature generation functions each have a different design, and so they generate completely different values even if the inputs (the IDs) are the same.

3. The n signature generation functions are sequentially bound to one another, in the sense that one cannot generate the ith signature value in the chain, unless the (i−1)th signature value has been computed. This makes computation of other signature values conditional on the correct generation of a previous signature. There are different methods that can be achieved from a simple generate-verify process to the corruption and/or dependency between two generation functions. This chaining is applicable to the field of digital time stamping.

Further, in the context of the verification of a collection of various (ID, S(ID)) pairs, these different approaches are also available:

1. All the signature values verified must be correct to authenticate the ID;

2. A specific subset (e.g., k-out-of-n) of the signature values need to be correct to authenticate the ID;

3. An order can be introduced, that is for n signature values, it is not enough that all the signature values are correct, but one also needs to (timely) receive the signature values in a certain predetermined sequence.

This provides various embodiments where one might compute a set of signatures, to guarantee the authenticity of a set of signature values but also associate weight and/or timing significance to the logic of the verification.

In summary, the above discloses a way to improve the security of ID computation using hash functions and White Box cryptographic processes. One benefit resides in the mixing of properties, to ensure that the signature value is asymmetrical even if using only a symmetrical cryptographic process such as a block cipher (but in a White Box implementation). Thereby, signature verification is easy, but not the signature generation and vice versa.

Furthermore, the White Box technique advantageously hides computations that take place within the signature computation logic. A variety of basic elements may be combined to achieve the goal, as long as they offer specific properties: for instance, the symmetric block cipher process may be replaced by a stream cipher.

FIG. 1 shows in a block diagram relevant portions of a computing device (system) 160 in accordance with the invention which carries out the method and its associated cryptographic processes as described above to calculate the signature. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same platform.

The computer code is conventionally stored in code memory (computer readable storage medium) 140 (as object code or source code) associated with conventional processor 138 for execution by processor 138. The incoming conventional computer ID number (in digital form) is received at port 132 and stored in computer readable storage (memory 136 where it is coupled to processor 138. Processor 138 conventionally then provides the random number r and calculates the hash value using the ID and random number using conventional hash function module 142. Another software (code) module in processor 138 is the decryption (or encryption) module 146 which carries out the masking and decryption (or encryption) functions set forth above on the hash value, with its associated computer readable storage (memory) 152.

Also coupled to processor 138 is a computer readable storage (memory) 158 for the resulting signature value which is a combination (e.g., concatenation) of the decrypted value and the random number. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 1 is any subsequent conventional use of the resulting signature value stored in storage 145 to authenticate the ID value.

Figure 2:
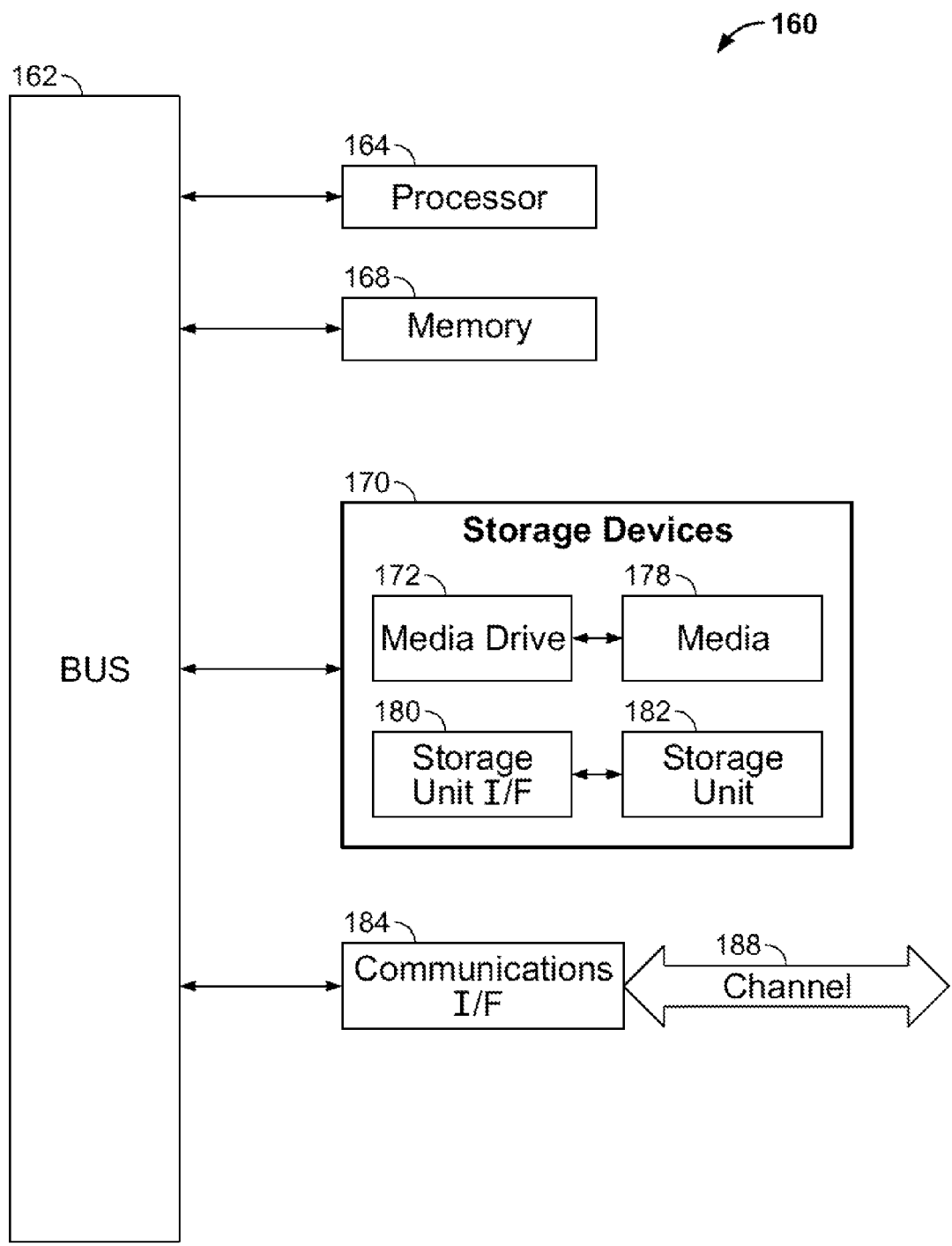
FIG. 2 shows a computing system as known in the art and used in accordance with the invention.

The associated verification apparatus would have somewhat similar elements as FIG. 2, plus conventional logic to verify the purported ID as explained above.

FIG. 2 illustrates detail of a typical and conventional embodiment of computing system 160 that may be employed to implement processing functionality in embodiments of the invention as indicated in FIG. 1 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 1). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to element 132 in FIG. 1). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of generating a signature for a computing device, the method comprising:
    receiving a particular value and a plurality of identifiers that each uniquely identifies the computing device, wherein each identifier is used to generate a different signature;
    applying a hash function using a combination of a received first identifier of the plurality of identifiers and the particular value to generate a hash value;
    applying a symmetric cryptographic operation to the hash value to generate a result;
    combining the result and the particular value to determine the signature for the computing device, wherein a received second identifier of the plurality of identifiers is used to generate a second signature by applying at least one of a different hash function and a different symmetricic operation; and
    storing the signatures for the computing device for later use by other devices in verifying the received identifier.

2. The method of claim 1, wherein each identifier of the plurality of identifiers is one of a serial number, a system number, a network identifier, and a user identifier.

3. The method of claim 1 further comprising applying a mask value or a permutation to the hash value prior to the application of the symmetric cryptographic operation.

4. The method of claim 3, wherein applying the mask value comprises applying an affine mask or a weak encryption.

5. The method of claim 1, wherein the symmetric cryptographic operation is a block or stream cipher.

6. The method of claim 5, wherein the symmetric cryptographic operation is Advanced Encryption Standard encryption.

7. The method of claim 1, wherein the symmetric cryptographic operation is a cipher encryption or decryption.

8. The method of claim 1, wherein the particular value is a random or pseudo random number.

9. The method of claim 1, wherein the signatures for the first and second identifiers are generated sequentially.

10. The method of claim 1, wherein the particular value is a random or pseudo random number, and the combination is a concatenation of the received first identifier and the particular value.

11. The method of claim 1, wherein each identifier is associated with one of a different computing process, entity, and resource.

12. The method of claim 1 further comprising applying a mask value or permutation to the result.

13. A method for verifying a plurality of identifiers of a computing device, the method comprising:
    receiving a plurality of signatures and the plurality of identifiers of the computing device, each identifier associated with a different signature;
    partitioning a first signature, associated with a first identifier, into a first portion and a second portion;
    applying a symmetric cryptographic operation on the first portion to generate a result;
    applying a hash function using a combination of the second portion and the first identifier to generate a hash value; and
    verifying the first identifier by comparing the hash value to the result of the cryptographic process, wherein a second identifier that is associated with a second signature is verified by applying at least one of a different symmetric cryptographic operation and a different hash function.

14. The method of claim 13, wherein the method further verifies one of (i) all the identifiers to determine a valid identifier, (ii) a predetermined number of the identifiers of the plurality to determine a valid identifier, and (iii) the identifiers in a predetermined order to determine a valid identifier.

15. The method of claim 13, wherein each identifier of the plurality of identifiers is one of a serial number, a system number, a network identifier, and a user identifier of the computing device.

16. The method of claim 13, wherein applying the symmetric cryptographic operation comprises performing a cipher decryption.

17. A non-transitory machine-readable medium storing a program which when executed by at least one processing unit generates a signature for a computing device, the program comprising sets of instructions for:
    receiving (i) a plurality of identifiers that each uniquely identifies the computing device and (ii) a particular value, wherein each identifier is used to generate a different signature;
    applying a hash function using a combination of a received first identifier of the plurality of identifiers and the particular value to generate a hash value;
    applying a symmetric cryptographic operation to the hash value to generate a result;
    combining the result and the particular value to determine the signature for the computing device, wherein a received second identifier of the plurality of identifiers is used to generate a second signature by applying at least one of a different hash function and a different symmetric cryptographic operation; and
    storing the signatures for the computing device for later use by other devices in verifying the received identifier.

18. The non-transitory machine-readable medium of claim 17, wherein each identifier of the plurality of identifiers is one of a serial number, a system number, a network identifier, and a user identifier.

19. The non-transitory machine-readable medium of claim 17, wherein the particular value is a random or pseudo random number and the combination is a concatenation of the received first identifier and the particular value.

* * * * *